Oct. 3, 1950   G. A. LYON   2,524,062
WHEEL TRIM RING
Filed Jan. 18, 1946
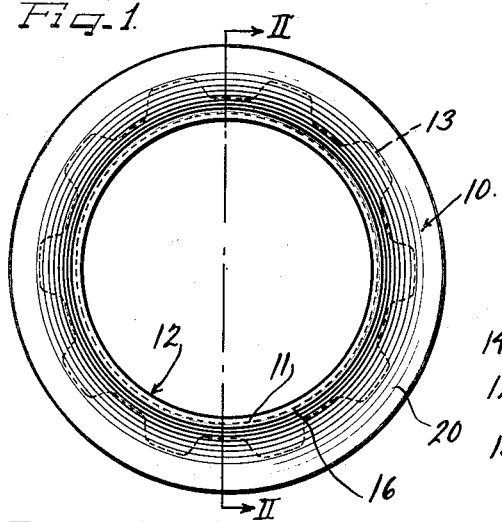
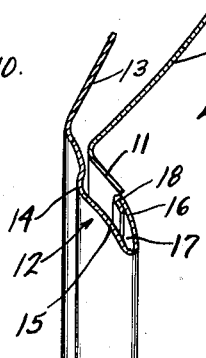
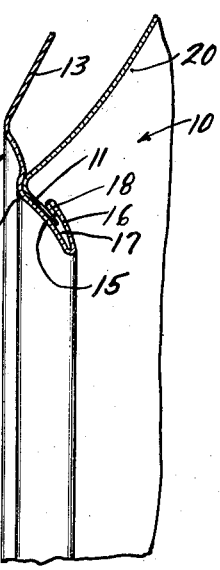
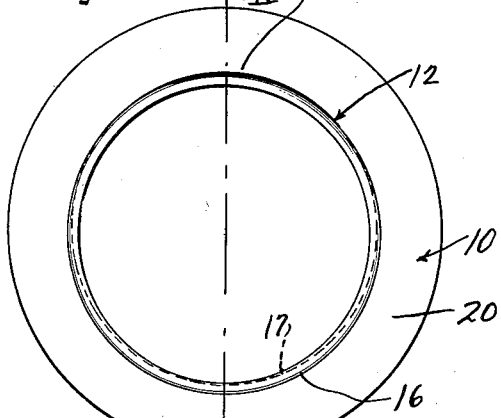
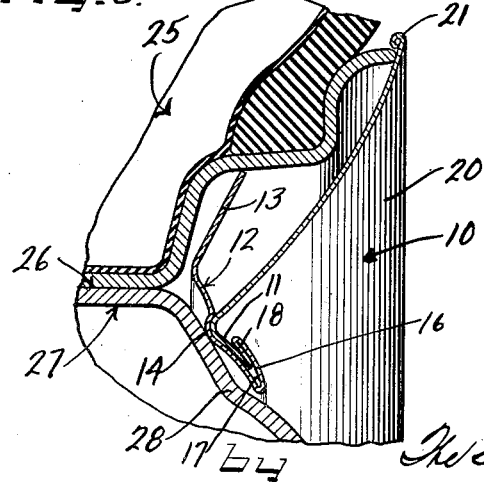
Inventor
GEORGE ALBERT LYON Patented Oct. 3, 1950

2,524,062

UNITED STATES PATENT OFFICE 2,524,062

WHEEL TRIM RING

George Albert Lyon, Allenhurst, N. J.

Application January 18, 1946, Serial No. 641,907

1 Claim. (Cl. 301—37)

This invention relates to an automobile wheel trim structure and more particularly to a composite trim and retaining ring structure interconnected in a unique and novel manner.

An object of this invention is to provide a simplified form of automobile wheel trim comprising a composite retaining and trim ring which lends itself to economical manufacture on a large production basis.

Another object of this invention is to provide an annular metal trim ring with a novel substantially concealed retaining ring connected thereto in a unique and simple manner.

Still another object of this invention relates to the provision of a novel way of manufacturing the aforesaid trim structure whereby the two rings may be quickly and simply interconnected with a minimum of operations and material.

In accordance with the general features of this invention there is provided a composite article of manufacture comprising an annular ornamental trim ring having a radially inner turned edge and a metal retaining ring disposed substantially therebehind, and having an inner turned edge defining a groove in which the radial inner edge of the trim ring is adapted to be progressively disposed by the flexing of portions of that edge over the turned edge of the retaining ring.

Another feature of the invention relates to the manner in which the turned radially inner edge of the trim ring is seated against a shoulder on the retaining ring so as to be nested therein, and whereby the extremity of the radially inner edge of the trim ring can be lock-seamed to the radially inner turned edge of the retaining ring.

Other objects and features of this invention will more fully appear from the folowing detail description taken in connection with the accompanying drawings which illustrate a single embodiment thereof and in which Figure 1 is a front view of a composite trim and metal retaining ring made in accordance with the features of this invention;

Figure 2 is a fragmentary enlarged cross-sectional view taken on substantially the line II—II of Figure 1 looking in the direction indicated by the arrows;

Figure 3 is a view similar to Figure 1 showing how the radially inner edge of the outer trim ring is progressively flexed over the turned inner edge of the retaining ring into the inside of the groove of the retaining ring;

Figure 4 is an enlarged fragmentary cross-sectional view taken on substantially the line IV—IV of Figure 3 looking in the direction indicated by the arrows, and showing the lower portion of the turned edge of the outer trim ring disposed in the groove of the retaining ring and the upper portion in the progress of being flexed over the turned edge of the retaining ring so as to be thereafter snapped into the groove thereof; and Figure 5 is an enlarged fragmentary cross-sectional view taken through my novel ring structure and showing the manner in which it cooperates with the rim and body parts of a conventional wheel.

As shown on the drawings:

It is believed that my novel way of making a trim ring structure will be best understood from a description of the figures in the accompanying drawings illustrating a composite article made in accordance with the features of this invention.

The reference character 10 designates generally an annular metal trim ring of convex-concave cross-section and which is of such a size that it lends itself to application as a trim for a given size of automobile wheel, as, for example, is shown in Figure 5 to be hereinafter described.

It will be noted that the ring extends generally in a radial direction and is bowed or curved outwardly in an axial direction (Figures 2 and 5). The ring has its radially inner margin formed into a continuous turned divergent edge 11 inclined radially inwardly and axially outwardly from the main body 20 of the ring.

The ring 10 may be made of any suitable metallic material, although excellent results may be obtained by stamping or rolling it from thin metallic sheet, such as stainless steel or the like. Preferably a material is used having some resiliency.

Now, in order to retain this trim ring on the wheel I propose to provide it with an attached metal retaining ring 12, the major portion of which is substantially concealed by the trim ring 10. This ring 12 is of a generally circular structure, and has its outer peripheral margin formed into a plurality of inclined spaced retaining fingers 13. (Figures 2 and 5). The extremities of these fingers are located in a circle of such diameter that the fingers can retainingly cooperate with a part of the wheel as will be described more fully in connection with Figure 5.

Due to the fact that these fingers must resiliently grip the wheel, it may be necessary to make the retaining ring 12 of a much more resilient type of metal than that from which the trim ring 10 is formed.

The main body of the ring 12 is provided with an angular bend at 14 so as to define an annular seat 15 for the radially inner turned edge portion 11 of the trim ring 10. The diameter of this angular bend 14 is such that the turned portion of the ring 10 can tightly nest thereunder when the rings are assembled together, as shown in Figures 2 and 5.

The inner peripheral portion of the ring 12 is turned back upon itself at 16 to define an annular groove 17 between the turned portion 16 and the seat portion 15. The outer extremity of the turned portion 16 may be beaded or folded upon itself at 18, if the same is so desired. In this manner there is provided in a radial inner peripheral portion of the metal retaining ring 12 an annular pocket or groove 17 in which the inner extremity of the turned portion 11 of the trim ring 10 is adapted to be retained.

In applying the trim ring 10 to the retaining ring 12, a portion of the turned edge 11, as shown at the bottom of each of Figures 3 and 4, is first inserted in the groove 17 in much the same manner as a portion of a tire is inserted in a drop center rim in the progressive application of a tire to the rim. Thereafter the edge portion 11 of the trim ring 10 is progressively flexed over the edge 18 of the retaining ring, as shown in the upper portions of Figures 3 and 4 until the entire edge 11 is received in the groove 17 between portions 15 and 16 of the retaining ring.

It is, of course, clear that the diameter of the extremity of the edge of portion 11 is such as to require flexing of the edge portion 11 in order for it to be introduced in the groove 17. When the two rings are thus connected together they are held against separation but are still loosely connected. I propose thereafter to put the two rings in a press where they can be centered and the turned portion 16 of the retaining ring flattened against the edge 11 therebehind to lock-seam the inner edges of the rings together in the manner shown in Figure 2. In this way the trim rings are aligned with each other and are permanently affixed together in a unitary device.

A trim ring structure such as that shown in Figures 1 and 2 is adapted to be used with a wheel in the manner shown in Figure 5. It will be noted from Figure 5 that the main body 20 of the outer trim ring 10 extends radially and axially inwardly from a turned outer edge 21 to the bend 14 in the retaining ring 12 which is adapted to bear against a body part of a wheel. In this figure I have designated the usual tire and tube assembly by the reference character 25 and which assembly is mounted in the usual way upon a multi-flanged drop center type of tire rim 26. This tire rim, as is well known in the art, is carried by a wheel body or spider part 27.

In the application of the trim ring to this wheel it is first placed over the center of the wheel and is then pressed axially toward the wheel so that the extremities of the retaining fingers 13 slide along a flange of the tire rim until the angular bend 14 of the trim ring bottoms against the body part 26, at which time the beaded edge 21 of the trim ring 10 will overhang the outer edge of the tire rim in close proximity to the outer side wall of the tire. When in this position the resilient retaining fingers 13, by reason of their angular or inclined structure will exert a retaining pressure against the flange of the rim to hold the trim ring structure tightly on the wheel.

Due to the radial extent of the body 20 of the trim ring together with its particular configuration, the trim ring will, in use, appear to constitute a radial inner extension of the side wall of the tire. This appearance can be enhanced by providing the portion 20 with a white external surface in which event it will appear to constitute a white side wall part of the tire. In other words, the tire will then appear to extend clear down to the body part of the wheel and will afford an illusion of being a white side wall tire. In order to facilitate the removal of the trim ring structure from the wheel, the body part 27 may be slightly indented at 28 so that a screw driver may be inserted under the turned edge of the retaining ring for the purpose of forcibly prying the trim ring structure off of the wheel.

In this process of removal, the fingers 13 will resiliently buckle so that they can be progressively disengaged from their retaining contact with the flange of the tire rim.

In addition, if it is so desired, the turned outer portion 16 of the retaining ring may be given a highly lustrous finish so as to provide the trim ring assembly with a lustrous ornamental band or bead at the radial inner edge of the ring assembly. If the retaining ring is made of stainless steel, this can be easily accomplished by a suitable buffing or grinding operation. The same effect can also be obtained by chromium plating the portion 16. In this manner a very desirable color contrast can be obtained as between the trim ring 10 and the body part 27 of the wheel.

I claim as my invention:

In a wheel structure including a wheel having a load bearing body member and a flanged tire rim including a generally axially extending intermediate flange, an ornamental trim comprising concentric axially inner and outer metal rings with the outer ring disposed over the major portion of the inner ring and extending over the flanges of the rim to the body member, said inner ring being provided on its outer periphery with retaining fingers for engagement with the intermediate flange of the tire rim and the inner periphery of the inner ring being turned back upon itself and over a radially inner portion of the outer ring to secure the two rings together and providing an ornamental annular bead concealing the juncture of the rings, said outer ring having its outer edge reinforced and solidly bottomed against a rim flange outwardly of said intermediate flange and having its radially inner margin rigidly nested in said inner ring radially outwardly of said annular bead and solidly pressing the nested portion of the inner ring against the wheel body.

GEORGE ALBERT LYON.

REFERENCES CITED

The following references are of record in the file of this patent:

UNITED STATES PATENTS

| Number | Name | Date |
|---|---|---|
| 2,306,631 | Lyon | Dec. 29, 1942 |
| 2,368,229 | Lyon | Jan. 30, 1945 |
| 2,431,699 | Lyon | Dec. 2, 1947 |